United States Patent [19]

Daurelles et al.

[11] Patent Number: 4,661,357

[45] Date of Patent: Apr. 28, 1987

[54] PROCESS FOR THE PREPARATION OF RIPENED PROCESS CHEESE

[75] Inventors: Jacques Daurelles, Lons le Saunier; Christian Lombart, Vendome, both of France

[73] Assignee: Fromageries Bel, Paris, France

[21] Appl. No.: 636,801

[22] Filed: Aug. 2, 1984

[30] Foreign Application Priority Data

Aug. 3, 1983 [FR] France .................. 83 12818

[51] Int. Cl.$^4$ ............... A23C 19/08; A23C 19/084; A23C 19/093; A23C 19/14
[52] U.S. Cl. .......................... 426/37; 426/36; 426/38; 426/39
[58] Field of Search ............ 426/37, 38, 39, 36, 426/42, 40, 238, 240, 241, 242

[56] References Cited

U.S. PATENT DOCUMENTS 2,148,593  2/1939  Teller et al.
3,375,118  3/1968  Cox ....................... 426/38

OTHER PUBLICATIONS

Meyer (1973) Processed Cheese Manufacture; Food Trade Press Ltd London pp. 152–154.
Davis (1965) Cheese vol. 1, Basic Technology; American Elsevier Publishing Co., Inc. pp. 395–397; 426–431 and 438–439.
Kosikowski (1966) Cheese and Fermented Milk Foods; Dept. of Food Science, Cornell University, Ithaca, N.Y., published by author, pp. 294–303.

Primary Examiner—David M. Naff
Assistant Examiner—William J. Herald
Attorney, Agent, or Firm—Young & Thompson

[57] ABSTRACT

A ripened process cheese having the appearance and the organoleptic properties of a soft or hard or semi-hard cheese with a moldy rind, is prepared by forming a cheese block from a cheese melt, acidifying the surface of the cheese block to a pH of 4 to 5 to flocculate surface proteins and form a pre-rind, seeding the acidified surface of the cheese block with ripening molds, and ripening the thus seeded cheese block. Acidification of the surface prevents undue lipolytic and proteolytic breakdown of the cheese by action of enzymes of the molds.

9 Claims, No Drawings

PROCESS FOR THE PREPARATION OF RIPENED PROCESS CHEESE

This invention relates to a new process for the preparation of ripened process cheese.

More specifically, this invention concerns the preparation of process cheese or of specialty process cheese products having the appearance of a soft cheese or a hard or semi-hard cheese with a moldy rind and which exhibit a stable shelf life in excess of 7 weeks under normal conditions. The invention relates also to the preparation of mixed cheeses containing distinct items such as natural cheeses.

There can be found, in the literature, a variety of processes for the preparation of such products which combine the conventional attractive properties of aspect, flavor and texture of the soft, hard or semi-hard cheeses that have met with consumer approval with the shelf life characteristics of processed cheeses.

Thus, patent No. FR-2 188 959 describes the preparation of a process type cheese, essentially comprising incorporating in a basic process cheese formula about 15 wt% curdled white cheese and, after cooling, submitting the process cheese to a ripening procedure by seeding and proliferation on its surface of surface molds until a rind is formed.

This process has drawbacks at the level of the development of the molds, of the flavor and of the texture of the resultant cheese. Indeed, the mold seeding is effected on an already highly degraded protein medium and, due to the proteolytic and lypolytic action of the enzymes it secretes, it induces very rapidly bitter rancid tastes.

In addition, the resulting products, in view of the raw materials used in the melt, do not exhibit the traditional smooth texture of soft cheeses.

European Patent Application No. EP-A-3 300 635 discloses a process which makes it possible to produce a cheese closely similar to the soft cheese it is desired to imitate, and which prevents the enzymatic action of the mold.

In the melting procedure, this process uses the conventional soft cheese it is desired to "imitate". An artificial barrier is applied on the surface of the cheese melt prior to the application of the mold, so that the enzymes secreted by the latter will not enter into the cheese melt and will not degrade the components of the latter, which components have already been degraded in the course of the ripening of the basic cheese used. The barrier is obtained by vaporization over the surface of the cheese melt of chemicals capable of reacting with the calcium present in the cheese melt, such as sodium alginates or potassium carraghenates, which, by interaction with the calcium, form an impervious surface "barrier".

Applicant has found that it was not indispensable to form an "impervious barrier" between the cheese melt and the molds to prevent the development of objectionable flavors and of objectionable odours due to an over-ripening, corresponding to a ripening of already degraded pastes.

In addition, in the case of the products prepared according to the above-mentioned patents, the resultant process cheese has a soft texture and the subsequent steps of vaporization of the mold and of turningover in the course of the ripening procedure are mechanically difficult.

Applicant has developed a treatment of process cheese which has the additional advantage of making the procedure mechanizable and, thus, less costly.

The process developed by Applicant results in an end product similar to soft, hard or semi-hard cheese both from the standpoint of flavor and from the standpoint of texture, and which exhibits a much improved shelf-life over the corresponding "natural" cheese, while preventing the drawbacks of the disclosed processes. In addition, the process permits the preparation of composite cheeses including other items.

This invention relates to a process for the preparation of a ripened process cheese having the appearance and the organoleptic properties of soft or hard or semi-hard cheese with a moldy rind, which involves forming a cheese block from a cheese melt, seeding the surface of the cheese block with ripening molds, and ripening the thus seeded cheese, said process comprising, prior to said seeding procedure, submitting the cheese block to a surface acidification treatment.

The acidification treatment induces the formation of a "pre-rind" by flocculation of the surface proteins, and concomitantly permits facilitating the mechanization of the process, reducing the pH of the cheese melt by approximating said pH with that of a coagulum commonly used for the preparation of soft or hard or semi-hard cheese, and promoting the fixation and the development of the molds, while preventing an unduly high lipolytic and proteolytic breakdown of the cheese melt under the action of the ripening enzymes.

The surface acidification treatment may be effected with acidifying ferments, typically lactic ferments, or with an acidifying agent such as lactic acid or citric acid.

The treatment with the acidifying ferments may be effected by pulverisation with an aqueous suspension of the ferments, the acidification being continued until the desired surface pH is obtained.

The treatment with the acidifying agents such as lactic acid may be effected by pulverisation of an aqueous solution of the acidifying agent, or by immersion into said solution. The contact times are set to give the desired pH. The cheese block is then advantageously drained at a temperature of about 20° C., for several hours.

In this treatment, the pH is advantageously reduced to a value between 4 and 5, preferably between 4.5 and 4.6.

In the process of this invention, the components used to form the melt are advantageously selected so that—depending on the cheese it is desired to obtain—this melt exhibits a composition and a condition close to those of a coagulum meant to be converted into a soft, hard or semi-hard cheese.

To approximate the composition of the coagulum, casein is advantageously added to the materials used to prepare the melt, in an amount of at least 2% by weight of the melt. Said casein may be added as casein or as a caseinate.

Practically speaking, by a careful selection of the raw materials (and of the ripening time), the present invention results in the production of the equivalent of a hard or semi-hard or of a soft cheese.

Particularly, to obtain the equivalent of a hard or semi-hard cheese, the dry solids content is selected to be at least 60 wt %.

According to a first embodiment, the melt is prepared according to a conventional technique, using as basic raw materials at least a conventional hard or semi-hard cheese, casein and/or caseinates, and a technological melting agent, typically sodium phosphates, polyphosphates and citrates. Fats, preferably of butyric type, and protein concentrates may optionally be added.

The cheese/casein-caseinates/concentrates ratio is advantageously such that the cheese melt will not have a "brittle" texture and will contain a sufficient amount of casein in an undegraded condition for the components of the melt to be in a condition close to that of a fresh coagulum designed to be converted into a conventional soft, hard or semi-hard type cheese.

According to another embodiment of this invention, a melt is prepared according to a special technology comprising specially selecting the materials for the melt so that they will melt to give a homogeneous mass without using conventional technological melting agents. For this purpose, a melt is prepared which contains an admixture of fresh lactic curd, of casein and/or caseinates and, optionally, of fats (preferably of butyric type), protein concentrates, and partly or totally deionized milk.

This embodiment is preferably used because, in addition to its economic advantage, the major part of the materials used results in a melt whose casein is only slightly degraded and closely approximates that of a fresh coagulum designed to be converted into a conventional soft or hard or semi-hard product.

In either case, kitchen salt is advantageously added to the mixture. If required, an acidifying agent may be added, in order to obtain a relatively low pH close to that of a lactic coagulum. The pH of the melt is advantageously between 5.3 and 6.

The melting procedure may be effected in a heat exchanger conventionally used in the melting technology, within a temperature range of from 90° C. to 120° C., for a period of time of 1–5 minutes.

After casting into blocks and surface acidification treatment, the surface of the blocks is seeded with ripening molds, such as those conventionally used for the ripening of cheese.

The strains used are selected as a function of their special lipolytic and proteolytic enzymatic properties and their development does not induce the formation of traditional bitter rancid compounds, while imparting to the surface of the cheese a "moldy fluff" highly characteristic of moldy pastes. *Penicillium candidum* may be used for that purpose. Other strains of Penicillium and *Brevibracterium linens* are also useful.

After seeding, the cheese blocks are placed for 6–10 days in a drying room, under temperature and hygrometry conditions suitable for the development of the surface growth. The temperature selected is within the range from 10°–14° C. and the hygrometry is about 85–98%.

Subsequent to this ripening period, the cheese is packaged. In contrast to a traditional soft product which has a shelf-life of about 5 weeks, this cheese has a shelf-life in excess of 7 weeks.

An advantageous means for stopping any subsequent development of the mold which may produce bitter flavors, comprises submitting the cheese products of micro-wave or ionizing radiation treatments.

It is understood that the resultant cheese may have any desired shape (i.e. it may be shaped as cylinders, cubes, cones, parallelepipeds, spheres, and the like) and any size, i.e. comprised between a mouthful and a tomme.

At the time of the melting process, one may also add a variety of other components to the melt, such as pepper, herbs, spice, and the like.

In addition, it is also possible to prepare a mixed cheese, which is a mixture of process cheeses with included natural cheeses of any shape.

In such case, a cheese block is formed, by superimposing within a mold layers of hot cheese melt and natural cheese portions, and allowing the block to cool. The block is then submitted to the acidifying treatment, and sprayed with the ripening molds, particularly *Penicillium candidum*, after which it is submitted to the ripening procedure.

An advantageous ultimate form involves including slices of natural cheese, particularly of blue cheese type, within a cheese melt.

The following non-limiting Examples are given to illustrate the present invention.

EXAMPLE 1

A mixture of Cheddar, Gouda, caseinate, powdered milk, kitchen salt and melting salts (melting agents) is prepared, using the following amounts:

|  | Weight % of dry solids |
| --- | --- |
| Cheddar | 42 |
| Gouda | 25 |
| Caseinate | 5 |
| Milk | 6 |
| NaCl | 0.5 |
| Melting salts (sodium polyphosphate) | 2.5 | in order to obtain, after melting at 110° C., a mixture of which the dry solids content and the fats content are those of a semi-hard product, of Tomme type, i.e.:
Fats: 45% (by weight of dry solids)
Dry solids: 60%.

The whole is melted at 110° C. for about 2 minutes. The melt has a pH of 5.5. The material is cooled to 85° C. and this hot melt is cast into molds having the size of the desired cheese. After cooling for a period of time of 4–48 hours, to give a sufficiently hard texture, the resulting material is unmolded.

The cheese is then immersed is a mixed lactic acid (150 g/l)/citric acid (50 g/l) for a period of time of 5 minutes, to a pH of 3.6, and is then allowed to drain for 1 hour at a temperature of 20° C.

A spore suspension of *Penicillium candidum* having specific enzymatic properties is then sprayed over the cheeses which are allowed to ripen for 9 days in a ripening room under the following conditions: hygrometry 92%, at 12° C., and are then allowed to ripen for 1 day in a ripening room under the following conditions: hydrometry 92%, at 14° C. During this entire period of time, the cheese is the object of intensive care.

After this period of time, the mold growth is stopped by passage of the cheese in a micro-wave oven for 30 seconds.

The resulting material, which has the outer appearance of a hard or semi-hard cheese (presence of a white fluff) is then packaged and marketed. The product has a shelf-life of 6 months.

EXAMPLE 2

A mixture of fresh fatty coagulum, cream, sodium caseinate, powdered milk, kitchen salt and citrates is selected, in the following amounts:

|                      | Weight % of dry solids |
|----------------------|------------------------|
| Fatty curd           | 60                     |
| Cream                | 18                     |
| Caseinate            | 3.5                    |
| Powdered skimmed milk| 6                      |
| NaCl                 | 1                      |
| Citrate              | 0.5                    | in order to obtain a mixture having a dry solids and a fats content similar to those of a high-fat soft cheese of Camembart type, i.e.:

Fats: 70%,

Dry solids: 50%.

The whole is melted at 100° C. for 1 minute. The melt has a pH of 5.3. The material is cooled to 80° C., and this hot melt is cast into molds of Camembert size, and is then allowed to cool for a period of time of 6-48 hours to give a sufficiently hard texture to a cheese.

A 2% suspension of lactic ferments is sprayed on the outer sides of the cheese, after which acidification is allowed to proceed for a period of time of 2-6 hours until a surface pH of 4.6 is obtained.

The cheese is then sprayed with a spore suspension of *Penicillium candidum* having a spore concentration of $10^5$–$10^7$ spores/ml.

The cheese is placed in a ripening room in which the hygrometry and temperature conditions are 95% and 14° C., respectively.

The cheese is allowed to ripen for 8 days. During this entire period of time, the cheese is the object of intensive care (turning-over, and the like).

The Penicillium growth is then stopped by passage in a micro-wave oven, under the previously described conditions.

The resulting cheese is then packaged and marketed. The product has then a shelf-life of 6 months.

EXAMPLE 3

The starting materials are a creamy process cheese analogous to that used in Example 1 (with a dry solids content of about 60 wt % and a fats/dry solids ratio of about 45 wt %) and a blue cheese produced from pasteurized milk having a dry solids content of 50 wt %.

The cheese melt is cast in an aluminum or plastic mold at a temperature between 80° and 95° C., and slices of blue cheese (pre-sliced, with the rind removed) are successively placed between the layers of cheese melt, with a final top layer of cheese melt.

When the mold has been filled, it is closed and the whole is allowed to cool, first to room temperature, and then by cooling to 5° C.

The cheeses are unmolded the following day and are submitted to an acidification treatment as in Example 1.

All sides are then sprayed with a spore suspension of *Penicillium candidum*. The cheeses are placed in a ripening room at a temperature of 12°–14° C. and under hygrometric conditions of 90% for a period of time of 6–8 days, and are then packaged for marketing purposes. The Penicillium growth imparts to the cheese and appearance of cheese with a moldy rind.

What is claimed is:

1. Process for the preparation of ripened process cheese having the appearance and the organoleptic properties of a soft or hard or semi-hard cheese with a moldy rind, comprising of the steps of: forming a process cheese melt from components selected such that said melt has a composition and condition approximating those of a coagulum suitable for conversion into said soft or hard or semi-hard cheese; forming a cheese block from said process cheese melt; submitting the surface of said cheese block to a surface acidification treatment to acidify the surface to a pH of 4–5, and thereby inducing the formation of a pre-rind by said acidification; seeding the acidified surface of said cheese block with ripening molds; and ripening the thus-seeded cheese block.

2. Process according to claim 1, wherein casein or caseinate is added to the components used to form said cheese melt, in an amount of at least 2% by weight of the cheese melt.

3. Process according to claim 1, wherein said components comprise at least a hard or semi-hard cheese, casein and/or caseinates, and a melting agent.

4. Process according to claim 1, wherein said components comprise a fresh lactic curd, casein and/or caseinates.

5. Process according to claim 1, wherein the pH in said surface acidification treatment is between 4.5 and 4.6.

6. Process according to claim 1, wherein said ripening molds comprise strains from the genus Penicillium.

7. Process according to claim 6, wherein said ripening molds comprise a *Penicillium candidum* strain.

8. Process according to claim 1, wherein said step of forming a cheese block comprises superimposing layers of hot cheese melt and portions of at least one cheese in a mold.

9. Process according to claim 1, wherein said ripening step comprises mechanically turning over said thus-seeded cheese.

* * * * *